July 29, 1952     O. F. GERRY     2,605,085
BEATER EJECTOR
Filed April 17, 1951     2 SHEETS—SHEET 1
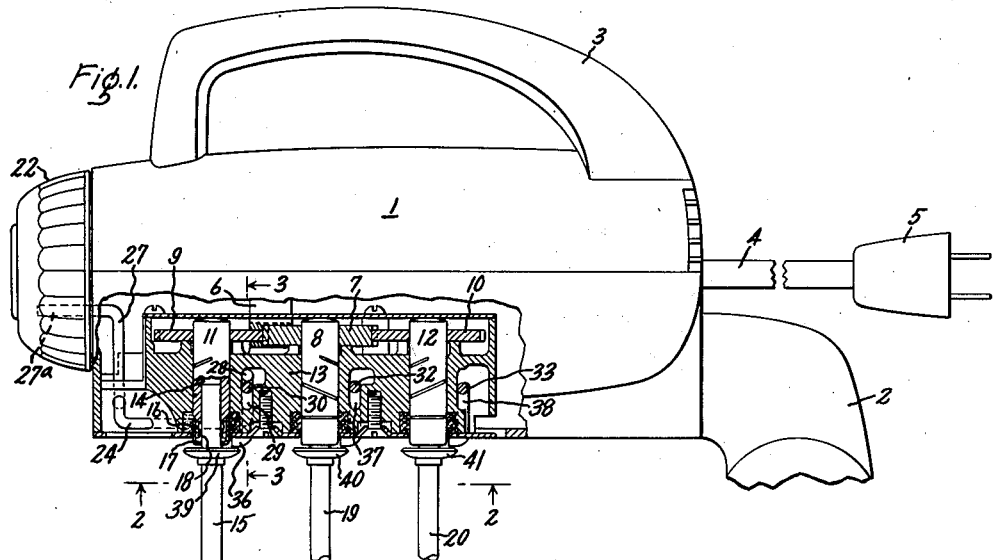
Inventor:
Otto F. Gerry,
by [signature]
His Attorney.

July 29, 1952 — O. F. GERRY — 2,605,085
BEATER EJECTOR
Filed April 17, 1951 — 2 SHEETS—SHEET 2
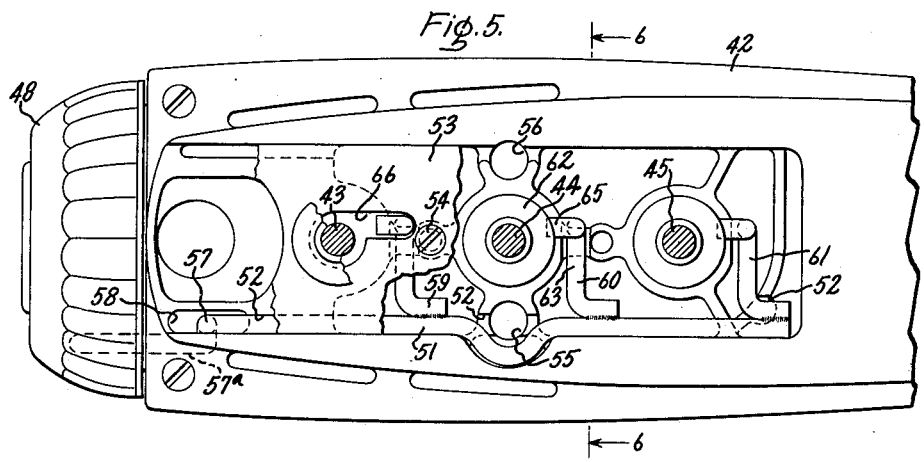
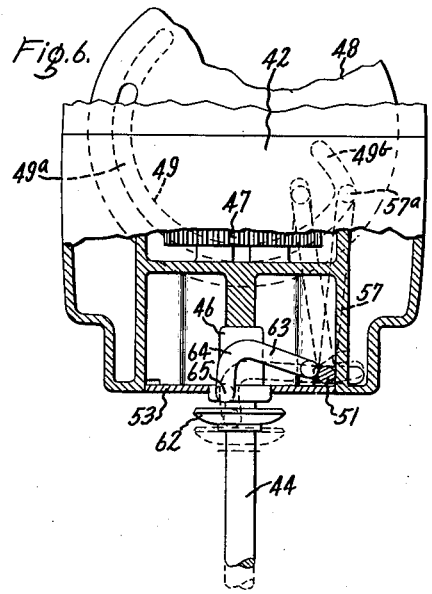
Inventor:
Otto F. Gerry,
by His Attorney.

Patented July 29, 1952

2,605,085

UNITED STATES PATENT OFFICE 2,605,085

BEATER EJECTOR

Otto F. Gerry, Brockport, N. Y., assignor to General Electric Company, a corporation of New York Application April 17, 1951, Serial No. 221,389

13 Claims. (Cl. 259—1)

This invention relates to kitchen mixers, and more particularly to an improved mechanism for detaching the mixing tools from the power unit of the mixer.

In conventional kitchen mixers, the beaters or other mixing tools are ordinarily carried on the ends of downwardly extending spindles which are driven by the mixer drive motor. The connection between the spindles and the shafts of the beaters is, however, preferably not a permanent one, since it is desirable that the beaters be removed for cleaning and other purposes. Thus, it has become customary to key the beaters to the spindles by means of radially extending keys and axially extending keyways. A keying arrangement of this sort prevents any relative rotary motion between the beater shafts and the associated spindles when they are joined together, but permits axial movement of the beater shafts along the spindles to provide for the disengagement thereof.

In order to prevent the shafts from falling out of the spindles in certain kitchen mixers heretofore known, resilient means are employed to lock the shafts in the mixing or working position. These resilient means are so arranged that the beater shafts can neither be inserted in nor removed from the spindles unless a strong axial force is applied to the shafts. Thus, the beaters are inserted individually by the pressure of the housewife's hands, and they may also be so removed. However, in the better mixers, mechanical means, manually operable, are often provided to eject the beaters. These mechanical ejector means are provided both to reduce the manual effort needed to detach the beaters and also to allow the housewife to remove the spattered beaters without soiling her hands.

Although various beater ejector mechanisms have been employed heretofore, they have proved unsatisfactory for a number of reasons. For example, the cost of some has been excessive; others have detracted from the appearance of the mixers by requiring unsightly actuating levers; and still others have been faulty in operation. Moreover, some of these ejecting mechanisms are applicable to only certain types of mixers, for example, a two-beater mixer.

Therefore, it is a primary object of this invention to provide an improved mechanism for detaching the mixing tools of a kitchen mixer.

A further object of this invention is to provide an improved kitchen mixer structure in which the beater ejecting mechanism is hidden from view.

Another object is to provide a kitchen mixer structure including new and improved means for actuating a beater ejector mechanism.

Still a further object is to provide a beater ejector mechanism in which the number of moving parts is reduced to a minimum.

This invention also has as an object the provision of a beater ejector mechanism which is inexpensive in cost, easy to manufacture and simple to assemble in a mixer.

In accomplishment of the foregoing objectives, there are employed beater shafts to which projecting members are fixed adjacent the points of attachment between the shafts and the mixer power unit. Disposed in the mixer to cooperate with these projecting members is a rotatably mounted ejector member which has fingers adapted to engage the projecting members. Upon rotation of the ejector member in the correct direction, the fingers engage the projecting members and force the beater shafts outwardly, thereby detaching them from the power unit. The ejector mechanism is manually operated and is preferably actuated by the rotation of the mixer speed control knob through a predetermined position, a cam and lever system being employed to transmit the motion of the speed control knob to the ejector member. This cam and lever system may be formed integrally with the ejector member or may be in the form of a separate actuator which engages the ejector member. In either of these forms, the cam and lever system may be completely concealed within the mixer housing so as to enhance the appearance of the mixer.

The features of this invention, which are believed to be novel, are set forth with particularity in the appended claims. The invention itself, however, both as to organization and mode of operation, together with further objects and advantages thereof, may be best understood by reference to the following description, to be taken in conjunction with the accompanying drawing in which:

Fig. 1 is a side elevation view, partially in section, of an electric kitchen mixer embodying this invention in one form thereof;

Fig. 2 is a fragmentary bottom view of the mixer taken on the line 2—2 of Fig. 1;

Fig. 3 is an end section taken on the line 3—3 of Fig. 1, illustrating the mode of operation of the form of the invention shown therein;

Fig. 4 is a diagrammatic view further illustrating the mode of operation of the form of the invention shown in Fig. 1;

Fig. 5 is a bottom view, partially in section, of a kitchen mixer embodying an alternate form of this invention, and Fig. 6 is a view in partial section taken on the line 6—6 of Fig. 5.

Referring to Fig. 1, therein is shown one embodiment of this invention as applied in a household mixer. The power unit 1 of the mixer is supported on a suitable arm 2 which, in turn, is mounted on a base plate (not shown). To facilitate handling of the power unit, it is provided with a handle 3 firmly secured to the roof of the unit.

Included in power unit 1 is an electric motor (not shown) which may be energized through the two-conductor cord 4 and the male plug 5 from any conventional domestic power outlet. Driven by the motor is a pinion 6 which engages a gear wheel 7 to drive a spindle 8. Wheel 7 also mates with gears 9 and 10 to drive spindles 11 and 12. The spindles are journaled for rotation in a common bearing block 13, which forms part of the mixer framework and each of the spindles is adapted to receive and retain the shaft of a beater element in operative driving relationship.

Thus, for example, spindle 11 contains an axially extending recess 14 into which the upper end of a beater shaft, such as shaft 15, may be inserted. The wall of recess or socket 14 is slotted, preferably in quadrature, to receive the radially extending ears 16 which are secured to shaft 15. In other words, shaft 15 is keyed to spindle 11 by means of ears 16 and the slots in the socket wall.

Fitted over the lower portion of spindle 11 and secured thereto is a collar 17. The collar contains means for retaining shaft 15 within the spindle in the form of a resilient split ring 18. As the beater shaft is forced upwardly into the spindle socket, ears 16 cause split ring 18 to expand to allow their passage thereby. However, once the ears have moved past ring 18, it again contracts and thus retains the shaft in operative driving relation with the spindle. To remove the shaft, it is necessary to apply a considerable downward force thereto so that the ears may re-expand ring 18. Although resilient ring 18 constitutes a preferred manner of retaining the beater shaft in operative driving relation with the spindle, any of the numerous resilient arrangements well known in the art may be used, since the retaining means do not constitute part of this invention. In any case, similar shaft-receiving and retaining means are provided in spindles 8 and 12 so that they may drive their respectively associated beater shafts 19 and 20. Each of the beater shafts, of course, contains a beater element, such as beater 21, at its lower extremity.

In order to remove beater shafts 15, 19 and 20 simultaneously from their respective spindles, there is provided a new and improved manually operated beater ejector mechanism which is preferably actuated from the motor speed control knob 22. In the particular mixer illustrated, the knob 22 operates both the starting switch and the speed control device for the beater drive motor. The knob thus has an "off" position and a plurality of "on" positions angularly spaced in one direction from the "off" position to constitute a speed control sector. A speed control device of that sort, which may be employed herein, is disclosed and claimed in the copending application of Alastair Robertson, for "Speed Control Mechanism," Serial No. 77,746, filed February 23, 1949, now Patent No. 2,557,765, patented June 19, 1951, and assigned to the same assignee as the present invention.

Knob 22 operates the beater ejector mechanism through cam and lever means, i. e., a cam mounted on knob 22 cooperates with a cam follower secured to a drive lever or shaft, to actuate the ejecting means when the knob is rotated through a predetermined position. Thus, as is shown in Figs. 3 and 4, the inner surface of knob 22 is provided with a cam in the form of the cam surface 23, which has an arcuate portion 23a and an inwardly extending end portion 23b. In the illustrated embodiment, cam surface 23 comprises a groove cut in the inner surface of the knob, but it is obvious that the cam could be formed in other ways, for example, by raised members on the knob surface. The arcuate portion 23a extends through the entire speed control sector of the knob and also through the "off" position. Inwardly extending end portion 23b joins the arcuate portion adjacent the "off" position.

Disposed to be actuated by cam surface 23 are lever means comprising a beater ejector drive lever 24. As is shown in Fig. 2, drive lever 24 has a shaft portion which is rotatably mounted on the mixer framework by clip 25 to form a pivotal axis for the lever. Extending upwardly at a substantial angle to this pivotal axis and through a slot 26 in the mixer housing is an end lever portion 27, which has a projection 27a in engagement with cam surface 23. In effect, projection 27a forms a cam follower cooperating with cam surface 23. Also extending at a substantial angle to the shaft portion of lever 24 and attached thereto is a projection or finger 28. Finger 28 extends partially across the power unit in a slot 29 provided for that purpose, and engages a finger 30 which is pivotally mounted on the opposite side of the power unit centerline. Finger 30 actually is secured to the rotatably mounted ejecting member or shaft 31 on which are also mounted fingers 32 and 33. All these ejecting fingers are substantially identical, each being shaped basically in the form of a vertically disposed hook having an end portion extending transverse to the principal plane of the hook. For example, finger 30 has an essentially straight portion 34, a bent portion 35, and a transverse end portion 36. The ejecting fingers 30, 32 and 33 respectively extend through the slots 29, 37 and 38 provided in the mixer structure, and move in substantially vertical planes on rotation of member 31.

The transverse end portions of the ejecting fingers are adapted to engage the projecting or flange members 39, 40 and 41 which are respectively secured to beater shafts 15, 19 and 20 so as to be adjacent the power unit when the beater shafts are retained in operative driving relation to the spindles. Each of the flange members is actuated by a different finger of member 31; thus, finger 30 cooperates with flange 39, finger 32 with flange 40, and finger 33 with flange 41. The flange members actually serve a dual purpose, acting both as a part of the beater ejecting system and also as batter guards to prevent foodstuffs from working up the beater shafts into the moving parts of power unit 1.

To operate the beater ejector, assuming knob 22 to be in the off position, the knob is rotated in a direction opposite from that employed to energize the power unit, i. e., the knob is rotated in the counterclockwise direction as viewed from the left end of Fig. 1 to operate the beater ejector. As knob 22 rotates, drive lever projection 27a rides on the cam surface 23, and as long as the projection is in contact with arcuate portion 23a, drive lever 24 remains stationary. However, when the end of arcuate portion 23a is reached by projection 27a, drive lever 24 is set in motion through the interaction between inwardly extending cam portion 23b and the projection. Preferably, the "off" position of knob 22 is that illustrated in Fig. 3, so that any counterclockwise rotation beyond that point starts to operate the beater ejector mechanism.

As knob 22 is rotated counterclockwise past the position of Fig. 3, projection 27a moves into cam portion 23b and is carried by it. As projection 27a moves, drive lever 24 is pivoted on its axis and finger 28 rotates downwardly, the term "downwardly" referring to the mixer as viewed in Figs. 1, 3 and 4. As finger 28 rotates, it engages ejecting finger 30 and causes it to rotate downwardly. Since ejecting fingers 32 and 33 are mounted on the same shaft member, they, of course, rotate with it. As the ejecting fingers move downwardly, their transversely extending portions engage the flange members 39, 40 and 41, and force simultaneous downward movement of the beater shafts. This action is illustrated by the dotted lines in Fig. 4. The downward force applied to the beater shafts causes ears 16 to move against ring 18 with sufficient pressure that it expands and permits their passage thereby. This, of course, releases the shafts from engagement with the power unit and allows them to fall free. Once the beater shafts have been ejected, rotating knob 22 in the reverse direction to the "off" position returns drive lever 24 to its original position, while the re-insertion of a beater shaft upon the next use of the mixer returns ejecting member 31 to its original position.

Referring now to Figs. 5 and 6, there is illustrated an alternate embodiment of my invention as applied in a conventional household mixer similar to that shown in Fig. 1. As in Fig. 1, the mixer power unit 42 contains an electric drive motor (not shown) and a plurality of driven spindles (one of which is shown in Fig. 6) which respectively support beater shafts 43, 44 and 45 by resilient retaining means, such as those hereinbefore described. For example, referring to Fig. 6, beater shaft 44 is driven by a spindle 46 which is turned by the mixer drive motor through gear means including the gear wheel 47. A means for controlling the rotation of the beater shafts is provided by a rotatable motor speed control knob 48 which has an "off" position and a plurality of "on" positions spaced angularly in one direction from the "off" position to define a speed control sector. Preferably, knob 48 constitutes the controlling means for a speed control device of the type disclosed in the aforementioned Robertson application, Serial No. 77,746.

In the particular mixer structure illustrated, knob 48 also serves as the actuator for an alternate form of a beater ejector embodying this invention. For that purpose, the inner surface of knob 48 is provided with a cam in the form of a cam surface 49, having an arcuate portion 49a and an inwardly extending end portion 49b. The cam may be fashioned in any of the manners known in the art, one preferred manner being a groove such as is illustrated in the diagram.

Disposed to cooperate with cam surface 49 is a cam follower which is mounted on lever means formed integrally with a beater ejector member. Forming a part of this ejector member is a shaft portion 51 which is positioned in a segmental groove 52 in the bottom of power unit 42 and may be turned therein to act as a pivoting means for the member and its integral lever means. A base cover plate 53 secured to the power unit by a pair of screws, such as screw 54, is employed to retain shaft portion 51 in groove 52. The shaft portion is kinked to allow access to a recess 55 which, together with a similar recess 56, is used to support attachments, such as juice extractors, when the power unit is turned upside down.

Joined to the end of shaft portion 51 is another portion 57 of the ejector member, which portion 57 comprises the aforesaid lever means. End lever portion 57 extends upwardly at a substantial angle to shaft portion 51 through a slot 58 provided in the mixer housing, and has mounted on its end a projection 57a which engages cam surface 49. Projection 57a constitutes the above-mentioned cam follower.

Also secured to shaft portion 51 are a plurality of spaced ejecting fingers 59, 60 and 61. These ejecting fingers are substantially identical and are adapted to engage radially projecting members positioned on the beater shafts. For example, finger 60 cooperates with the flange member 62 which is so secured to beater shaft 44 that it is adjacent power unit 42 when the beater shaft is held in operative driving relationship with the power unit. The ejecting fingers are shaped basically in the form of a vertically disposed hook having a transversely extending end portion. Thus, finger 60 has an essentially straight portion 63, a bent portion 64, and a transversely extending end portion 65. It is the transversely extending end portions of the fingers which actually engage the beater shaft flange members. Base cover plate 53 is provided with slots, such as slot 66, which accommodate both the beater shafts and the ejecting fingers.

As previously mentioned, the beater ejecting means is operated by speed control knob 48. Preferably, the "off" position for knob 48 is that illustrated in Fig. 6 so that any further counterclockwise rotation of the knob begins to move the ejecting mechanism, the term "counterclockwise" referring to the knob as viewed in Fig. 5. When the knob is rotated in the counterclockwise direction beyond the preferred "off" position, projection 57a moves into and with inwardly extending cam portion 49b, thus acting as a cam follower. As projection 57a moves with cam portion 49b, as illustrated by dotted lines in Fig. 6, the ejector member is pivoted on its axis by the integral lever portion 57. This causes a downward movement of the ejecting fingers so that they engage the flange members on the beater shafts and apply downward forces thereto. These forces free the beater shafts simultaneously from engagement with their respective resilient retaining means and eject them from the power unit. Rotation of knob 48 in the reverse direction back to the "off" position returns the ejector lever to its original position through the action of the cam and the cam follower.

As is obvious from the drawings, a very desirable feature of both the embodiments of this invention described above is that they do not detract from the appearance of the mixer as have many conventional beater ejector mechanisms. Not only are the ejecting members hidden from view, but also an otherwise necessary member, the speed control knob, is made to serve as the actuating means for the ejector so that it is not necessary to add a disfiguring external actuating member to the mixer structure. Of course, if it were for some reason undesirable to actuate the ejecting mechanism from the speed control knob, other means could be employed. However, actuation by a speed control knob of the type described is doubly preferable in that it also provides a safeguard against accidental ejection of the beaters while the mixer is running. Such an accidental ejection is impossible since in order for the housewife to eject the beaters, she must first automatically turn off the drive motor. Still another advantage of using the speed control knob as the ejector actuating means is that the expense of a separate actuating member is avoided.

The actual ejecting system itself also possesses a very distinct advantage through its simplicity and ease of construction and assembly. For example, in the case of the preferred form illustrated in Figs. 5 and 6, the integral combination of the cam and lever means with the ejecting member results in a beater ejector mechanism having one moving part other than the actuating means. Moreover, this part is quite inexpensive in cost. Another advantage of this mechanism and also of the other illustrated ejector is that no matter what number of beater elements are used, they are all ejected simultaneously.

The application of this invention is not to be construed as restricted to a three-spindle mixer as is illustrated in the diagram or to a mixer in which the spindles are spaced along its longitudinal axis. Merely by changing the shapes of the lever members, the invention may be employed in various other types of mixers. Thus, while there have been described what are at present considered to be the preferred embodiments of this invention, it will be obvious to those skilled in the art that numerous changes and modifications may be made therein without departing from the invention, and it is, therefore, intended in the appended claims to cover all such changes and modifications as fall within the true spirit and scope of the invention.

What I claim as new and desire to secure by Letters Patent of the United States is:

1. In a household mixer, a power unit including a driven spindle, a beater element having a shaft receivable in said spindle, resilient means for retaining said shaft in said spindle in operative driving relation, and an ejector to release said shaft from said resilient retaining means comprising a projecting member affixed to said shaft in a position adjacent said spindle when said shaft is in operative engagement, an ejecting member rotatably mounted on said power unit and and provided with an ejecting finger adapted to engage said projecting member, an ejector drive lever pivotally mounted on said power unit having an end portion bent at a substantial angle to the pivotal axis and provided with a drive finger for engaging said ejecting finger, and manually operable means for moving said end portion of said drive lever to pivot said drive finger against said ejecting finger to effect rotation of said ejecting finger against said projecting member to eject said beater element.

2. In an electric mixer, the combination of a power unit including a motor and a spindle driven thereby, a manually actuated rotatable control member mounted on said power unit for controlling the rotation of said motor, a beater element having a shaft receivable in said spindle, resilient means for retaining said beater shaft in said spindle in operative driving relation, and an ejector to release said beater shaft from said resilient retaining means comprising a flange member affixed to said beater shaft in a position adjacent said spindle when said shaft is in operative engagement, an ejecting member rotatably mounted on said power unit and provided with an ejecting finger adapted to engage said flange member, and mechanical means connected to said control member to be actuated upon rotation of said control member past a predetermined point for causing rotary motion of said ejecting member to release said beater from said resilient retaining means through rotation of said ejecting finger against said flange member.

3. In an electric mixer, a power unit including a motor and a driven spindle, a manually actuated rotatable control member mounted on said power unit for controlling the rotation of said motor, a beater element having a shaft receivable in said spindle, resilient means for retaining said beater shaft in said spindle in operative driving relation, and an ejector to release said beater shaft from said resilient retaining means comprising a flange member affixed to said beater shaft in a position adjacent said spindle when said shaft is in operative engagement, an ejecting member pivotally mounted on said power unit provided with an ejecting finger engaging said flange member and having an end lever portion extending at a substantial angle to the pivotal axis, and mechanical means connecting said end lever portion to said control member and actuated upon rotation of said control member past a predetermined point for moving said end lever portion to cause pivotal motion of said ejecting member to effect the ejection of said beater shaft through a movement of said ejecting finger against said flange member.

4. In an electric mixer, a power unit including a motor and a driven spindle, a manually actuated rotatable control knob mounted on said power unit for controlling the rotation of said motor, a beater element having a shaft receivable in said spindle, resilient means for retaining said beater shaft in said spindle in operative driving relation, and an ejector to release said beater shaft from said resilient retaining means comprising a flange member affixed to said beater shaft in a position adjacent said spindle when said shaft is in operative engagement, an ejecting member rotatably mounted on said power unit and provided with an ejecting finger adapted to engage said flange member, an ejector drive lever pivotally mounted on said power unit having an end portion extending at a substantial angle to the pivotal axis and provided with a drive finger for engaging said ejecting finger, and mechanical means connecting said control member to said end portion and actuated upon rotation of said control member past a predetermined point for moving said end lever portion to pivot said drive finger against said ejecting finger to effect rotation of said ejecting finger against said flange member to eject said beater element.

5. An electric mixer comprising a power unit including a motor, a manually actuated rotatable knob mounted on said power unit for controlling the rotation of said motor, at least one beater element having a vertically disposed shaft supported from said power unit and connected to be driven by said motor, resilient means for retaining said shaft in operative driving relation on said power unit, and a beater ejector manually operable to remove said beater shaft from said power unit comprising a projecting member affixed to said beater shaft adjacent said power unit, an ejecting member rotatably mounted on said power unit and provided with an ejecting finger adapted to engage said projecting member, a cam mounted on said control knob, a cam follower for engaging said cam upon rotation of said control knob past a predetermined point, and lever means driven by said cam follower for causing rotation of said ejecting member whereby a downward movement of said finger against said projecting member is caused to remove said beater shaft from said power unit.

6. An electric mixer comprising a power unit including a motor, a manually actuated rotatable control knob mounted on said power unit for controlling the rotation of said motor, at least one beater shaft having a vertically disposed shaft supported from said power unit and connected to be driven by said motor, resilient means for retaining said shaft in operative driving relation on said power unit, and a beater ejector manually operable to remove said beater shaft from said power unit comprising a projecting member affixed to said beater shaft adjacent said power unit, an ejecting member rotatably mounted on said power unit and provided with an ejecting finger adapted to engage said projecting member, an ejector drive member pivotally mounted on said power unit having an end lever portion extending at a substantial angle to the pivotal axis and provided with a drive finger for engaging said ejecting finger, a cam mounted on said control knob, a cam follower mounted on said end lever portion for engaging said cam upon rotation of said control knob past a predetermined point whereby said end lever portion is driven by said cam follower to pivot said drive finger against said ejecting finger to effect a rotation of said ejecting finger against said projecting member to eject said beater element.

7. An electric mixer comprising a power unit including a motor, a manually actuated rotatable knob mounted on said power unit for controlling the rotation of said motor, at least one beater element having a vertically disposed shaft supported from said power unit and connected to be driven by said motor, resilient means for retaining said shaft in operative driving relation on said power unit, and a beater ejector manually operable to remove said beater shaft from said power unit comprising a projecting member affixed to said beater shaft adjacent said power unit, an ejecting member pivotally mounted on said power unit and provided with an ejecting finger for engaging said flange member and having an end lever portion extending at a substantial angle to the pivotal axis, a cam mounted on said control knob, a cam follower mounted on said end lever portion for engaging said cam upon rotation of said control knob past a predetermined point whereby said end lever portion is driven by said cam follower to cause a movement of said ejecting finger against said projecting member to remove said beater shaft from said power unit.

8. The combination in a household mixer of a power unit including a drive motor, a manually actuated rotatable control member mounted on said power unit for controlling the rotation of said motor, a plurality of beaters having vertically disposed shafts supported from said power unit in spaced relation, resilient means for retaining said shafts in driving relation on said power unit, and a manually operable beater ejector for ejecting said beater shafts from said power unit, comprising flanged members secured to said beater shafts adjacent said power unit, said control member being provided with a cam surface, an ejecting member rotatably mounted on said power unit and provided with fingers for engaging said flange members, and a cam follower disposed to be actuated by said cam surface upon rotation of said control member past a predetermined point and mechanical means operated by said cam follower for causing rotation of said ejecting member whereby said beaters are released from said power unit through a downward movement of said fingers against said flanged members.

9. The combination in a household mixer of a power unit including a drive motor, a manually actuated rotatable control member mounted on said power unit for controlling the rotation of said motor, a plurality of beaters having vertically disposed shafts supported from said power unit in spaced relation, resilient means for retaining said shafts in driving relation on said power unit, and a manually operable beater ejector for ejecting said beater shafts from said power unit comprising flanged members secured to said beater shafts adjacent said power unit, said control member being provided with a cam surface, an ejecting member pivotally mounted on said power unit provided with ejecting fingers for engaging said flanged members and having an end lever portion extending at a substantial angle to the pivotal axis, a cam follower mounted on said end lever portion and disposed to be actuated by said cam surface whereby rotation of said speed control member past a predetermined point pivots said ejecting member to release said beaters from said power unit through a downward movement of said fingers against said flanged members.

10. The combination in a household mixer of a power unit including a drive motor, a manually actuated rotatable control member mounted on said power unit for controlling the rotation of said motor, a plurality of beaters having vertically disposed shafts supported from said power unit in spaced relation, resilient means for retaining said shafts in driving relation on said power unit, and a manually operable beater ejector for ejecting said beater shafts from said power unit comprising flanged member secured to said beater shafts adjacent said power unit, said control member being provided with a cam surface, an ejecting member rotatably mounted on said power unit and provided with fingers for engaging said flanged members, an ejector drive lever pivotally mounted on said power unit having an end lever portion extending at a substantial angle to the pivotal axis and provided with a drive finger for engaging one of said ejecting fingers, a cam follower mounted on said end lever portion and disposed to be actuated by said cam surface whereby rotation of said control member past a predetermined point pivots said ejecting lever to actuate said ejecting member to release said beaters from said power unit through a downward movement of said ejecting fingers against said flanged members.

11. In a household mixer, a power unit including a plurality of driven spindles disposed in spaced relationship, a knob rotatably mounted on said power unit for controlling the rotation of said power unit having an "off" position and a plurality of "on" positions angularly spaced in one direction from said "off" position to form a speed control sector, a plurality of beater elements having shafts receivable in said spindles, resilient means for retaining said shafts in said spindles in operative driving relation, and an ejector to release said shafts from said resilient retaining means, said ejector comprising flanged members secured to said beater shafts adjacent said spindles, said speed control knob being provided with a cam surface having an arcuate portion extending through said speed control sector and said "off" position and having an inwardly extending end portion joined to said arcuate portion adjacent said "off" position, an ejector member pivotally mounted on said power unit and having a shaft portion extending in the direction of the spacing of said spindles, said ejector member being provided with an end portion forming a substantial angle to said shaft portion and with a plurality of fingers mounted on said shaft portion each adapted to engage a separate one of said flange members; said ejector end portion having a projection in engagement with said cam surface to act as a cam follower whereby rotation of said control knob beyond "off" position causes said projection to move into and with said inwardly extending portion of said cam surface to rotate said ejector shaft portion, effecting a downward rotation of said fingers against said flanged members to release said beater shafts from said resilient mounting means.

12. In a household mixer, a power unit including a plurality of driven spindles disposed in spaced relationship, a knob rotatably mounted on said power unit for controlling the rotation of said power unit and having an "off" position and a plurality of "on" positions angularly spaced in one direction from said "off" position to form a speed control sector, a plurality of beater elements having shafts receivable in said spindles, resilient means for retaining said shafts in said spindles in operative driving relation, and an ejector to release said shafts from said resilient retaining means, said ejector comprising flange members secured to said beater shafts adjacent said spindles, said speed control knob being provided with a cam surface having an arcuate portion extending through said speed control sector and said "off" position and having an inwardly extending end portion joined to said arcuate portion adjacent said "off" position, an ejector shaft pivotally mounted on said power unit and extending in the direction of the spacing of said spindles and provided with a plurality of fingers each adapted to engage a separate one of said flange members, an ejector drive lever pivotally mounted on said power unit having a first portion adapted to engage one of said fingers and a second portion provided with a projection in engagement with said cam surface to act as a cam follower whereby rotation of said control knob beyond said "off" position causes said projection to move into and with said inwardly extending portion of said cam surface to move said first portion downwardly against said one finger effecting a downward rotation of said fingers against said flanges to release said beater shafts from said resilient means.

13. In an electric mixer, a power unit including a motor and a driven spindle, a manually actuated control member mounted on the power unit for controlling said motor, a beater element having a shaft receivable in said spindle, means for retaining said beater shaft in said spindle in releasable operative driving relation therewith, an ejector member mounted on and movable with respect to said power unit for releasing said beater shaft from said retaining means, and means connecting said ejector member to said control member, said control member when moved in one direction from off position effecting actuation of said motor and when moved in another direction from off position effecting actuation of said connecting means to move ejector member to release the beater shaft from the spindle.

OTTO F. GERRY.

REFERENCES CITED

The following references are of record in the file of this patent:

UNITED STATES PATENTS

| Number | Name | Date |
|---|---|---|
| 2,048,455 | Knapp | July 21, 1936 |
| 2,093,534 | Wright | Sept. 21, 1937 |
| 2,098,098 | Jepson | Nov. 2, 1937 |
| 2,269,170 | Allenby | Jan. 6, 1942 |
| 2,293,959 | Wright | Aug. 25, 1942 |
| 2,325,434 | Stiles | July 27, 1943 |
| 2,515,755 | Krause | July 18, 1950 |